United States Patent [19]
Deutsch et al.

[11] Patent Number: 5,590,410
[45] Date of Patent: Dec. 31, 1996

[54] SYSTEM AND METHOD FOR FREQUENCY BASED ACQUISITION ACKNOWLEDGMENT BETWEEN TRANSMITTER AND RECEIVER

[75] Inventors: Brian M. Deutsch, Maple Valley; Robert B. Foster, Jr., Bellevue, both of Wash.

[73] Assignee: American Wireless Corporation, Bellevue, Wash.

[21] Appl. No.: 329,435

[22] Filed: Oct. 26, 1994

[51] Int. Cl.$^6$ ............................................ H04Q 7/20
[52] U.S. Cl. ........................ 455/76; 370/280; 379/61; 375/202; 455/88
[58] Field of Search .................... 455/34.1, 56.1, 455/75–76, 88; 379/61; 375/202, 205; 370/29, 95.1, 95.3

[56] References Cited

U.S. PATENT DOCUMENTS 5,278,992  1/1994  Su et al. .
5,323,447  6/1994  Gillis et al. .

OTHER PUBLICATIONS

"Sproad Spectrum Goes Commercial", Schilling et al; *IEEE Spectrum*, Aug. 1990; pp. 40–41 and 44–45.
"Principles of Communication Systems", Schilling et al, pp. 729–732 1986.

*Primary Examiner*—Andrew Faile
*Attorney, Agent, or Firm*—Fulbright & Jaworski L.L.P.-Dallas Office

[57] ABSTRACT

A communications system includes at least two communications units, each communication unit including a transmitter capable of transmitting to the other unit on one or more frequencies, under the control of a mode control unit and wherein acquisition or a locking of frequencies of the two communications units and timing signal recovery is achieved by transmitting signals on a group of predetermined frequencies, the transmission on each frequency being for a predetermined time frame in a sequence which is repeated after n+1 time frames, wherein n is the number of different frequencies to be transmitted by the originating communications unit, and the receiving unit including a receiver operating on one of the predetermined frequencies for n+1 time frames until the receiving unit receives a signal from the originating unit and transmits an acknowledgment signal to the originating unit thus locking the two units on one of the predetermined frequencies such that information, transmission and reception can proceed either in single frequency or in frequency hopping mode.

2 Claims, 7 Drawing Sheets

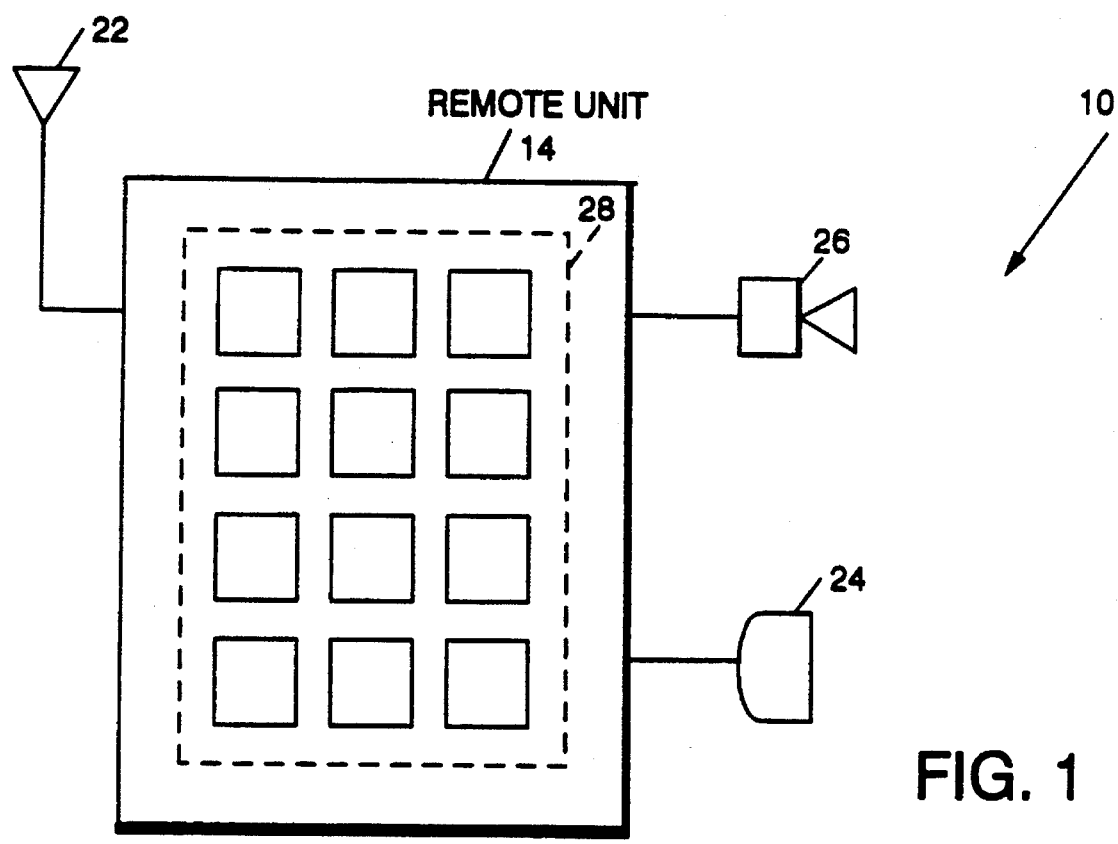
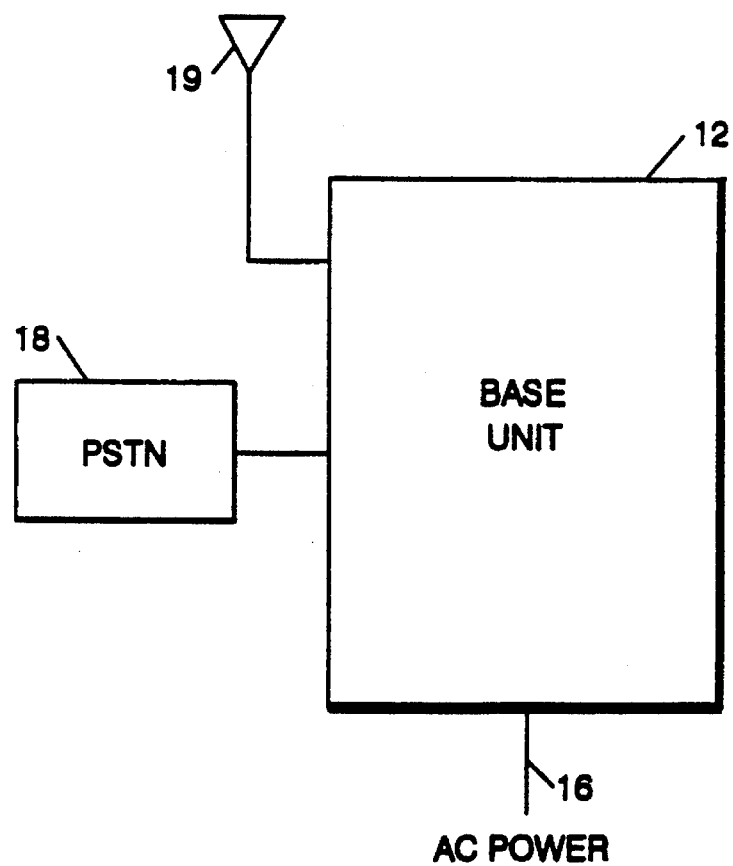
FIG. 1

FIG. 3
BASE & HANDSET IN STANDBY MODE

| FRAME | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| BASE | f1r | f1r | f1r | f1r | f2r | f2r | f2r | f2r | f3r | f3r | f3r | f3r | f1r | f1r |
| REMOTE | f2r | f2r | f2r | f2r | f3r | f3r | f3r | f3r | f1r | f1r | f1r | f1r | f2r | f2r |

ACQUISITION MODE;
BASE INITATES CALL

HANDSET ACQUIRES BASE

SYSTEM AND METHOD FOR FREQUENCY BASED ACQUISITION ACKNOWLEDGMENT BETWEEN TRANSMITTER AND RECEIVER

TECHNICAL FIELD OF THE INVENTION

The present invention relates to communication systems and more particularly to communication systems such as cordless telephone systems wherein transmitters and receivers may operate on a number of different frequencies in a frequency hopping mode.

BACKGROUND OF THE INVENTION

In communication systems where voice or data is transmitted from one unit to another by a radio frequency signal modulated by digital signals representative of information content of the voice or data, and wherein the transmitter and receiver may be operating on the same or different frequencies at any time prior to acquisition, a system is required to acknowledge acquisition and timing signal recovery to insure that the transmitter in a first communications unit of the system and a receiver in a second communications unit of the system are operating on the same frequency at the same time, even in frequency hopping mode.

One or more frequency channels are used for acquisition and timing recovery. These channels are scanned in a standby mode to detect a signal requesting communication. If a single channel is used for acquisition and timing recovery, jamming interfering signals or frequency selective fading might render that single channel unusable and therefore prevent communication until the acquisition and timing recovery channel becomes available. Further, the use of the single channel for acquisition and timing recovery may result in more than one receiver attempting to acquire the link and communicate with a transmitting station resulting in ambiguity.

Further, in either single channel or multichannel acquisition acknowledgment systems, the originating unit attempts to pass information to a remote unit and requests an acknowledgment in return. If the remote unit is acquired and transmits an acknowledgment, the transmitting station is ready to proceed with communication of information, but the remote station has not received any signal from the transmitting station indicating that the acquisition acknowledgment has been received by the transmitting station. This could result in a never ending series of attempts at acquisition acknowledgment which would effectively prevent communication between the two stations.

If the system is in frequency hopping mode, the problem of acquisition acknowledgment is made more severe due to the fact that a transmitting station might change frequency before an acknowledgment is received from a remote station and thus have its receiver on a different frequency when an acknowledgment is transmitted from the remote station to the original transmitting station. Thus, it is very important in such communication systems that each station be in synchronism with respect to beginning the frequency hopping sequence.

SUMMARY OF THE INVENTION

Therefore, it is an object of the present invention to establish communications between a base station and a remote station in a telephone system in which acquisition acknowledgment and timing recovery is required for communication.

Accordingly, a communications system includes at least two communications units, each communication unit including a transmitter capable of transmitting to the other unit on one or more frequencies, under the control of a mode control unit and wherein acquisition or a locking of frequencies of the two communications units and timing signal recovery is achieved by transmitting signals on a group of predetermined frequencies, the transmission on each frequency being for a predetermined time frame in a sequence which is repeated after n+1 time frames, wherein n is the number of different frequencies to be transmitted by the originating communications unit, and the receiving unit including a receiver operating on one of the predetermined frequencies for n+1 time frames until the receiving unit receives a signal from the originating unit and transmits an acknowledgment signal to the originating unit thus locking the two units on one of the predetermined frequencies such that information, transmission and reception can proceed either in single frequency or in frequency hopping mode.

It is an advantage of the present invention that frequency locking between two communications units may be obtained in a relatively few cycles of operation of the acquisition technique so that information and communications may proceed.

It is another advantage of the present invention to acknowledge acquisition by transmission and reception on one of a predetermined group of frequencies.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following description taken in conjunction with the accompanying drawing, in which:

FIG. 1 is a block diagram of a communications system in accordance with a preferred embodiment of the present invention having first and second communications units.

FIG. 3 is a time line chart showing receiver frequencies for the communications units of FIGS. 1 and 2 while in standby mode.

DETAILED DESCRIPTION OF A PREFERRED EMBODIMENT OF THE INVENTION

Figures 2, 2B:
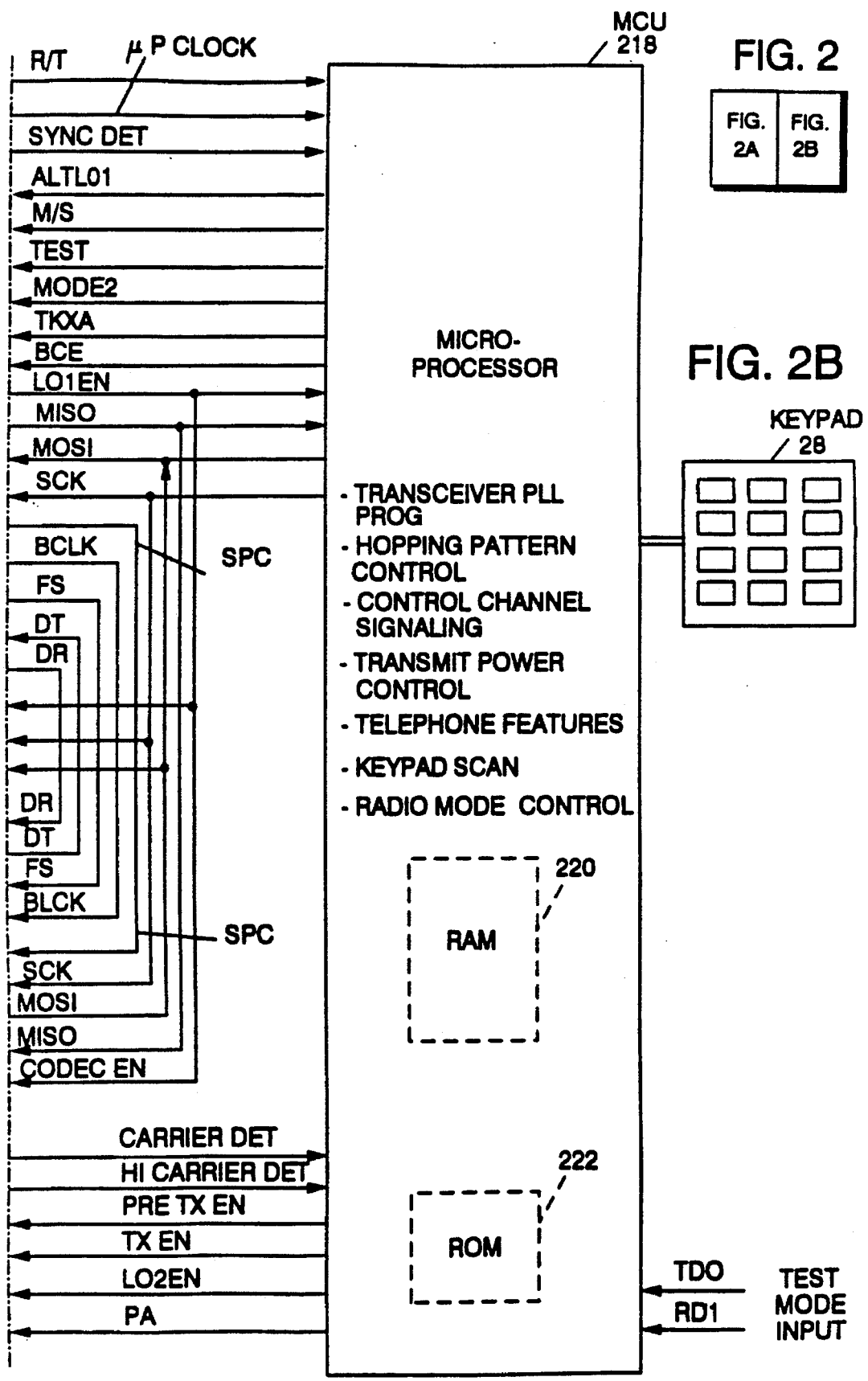
FIG. 2 is a block diagram of one of the communications units in FIG. 1 in accordance with a preferred embodiment of the present invention.
Figure 2A:
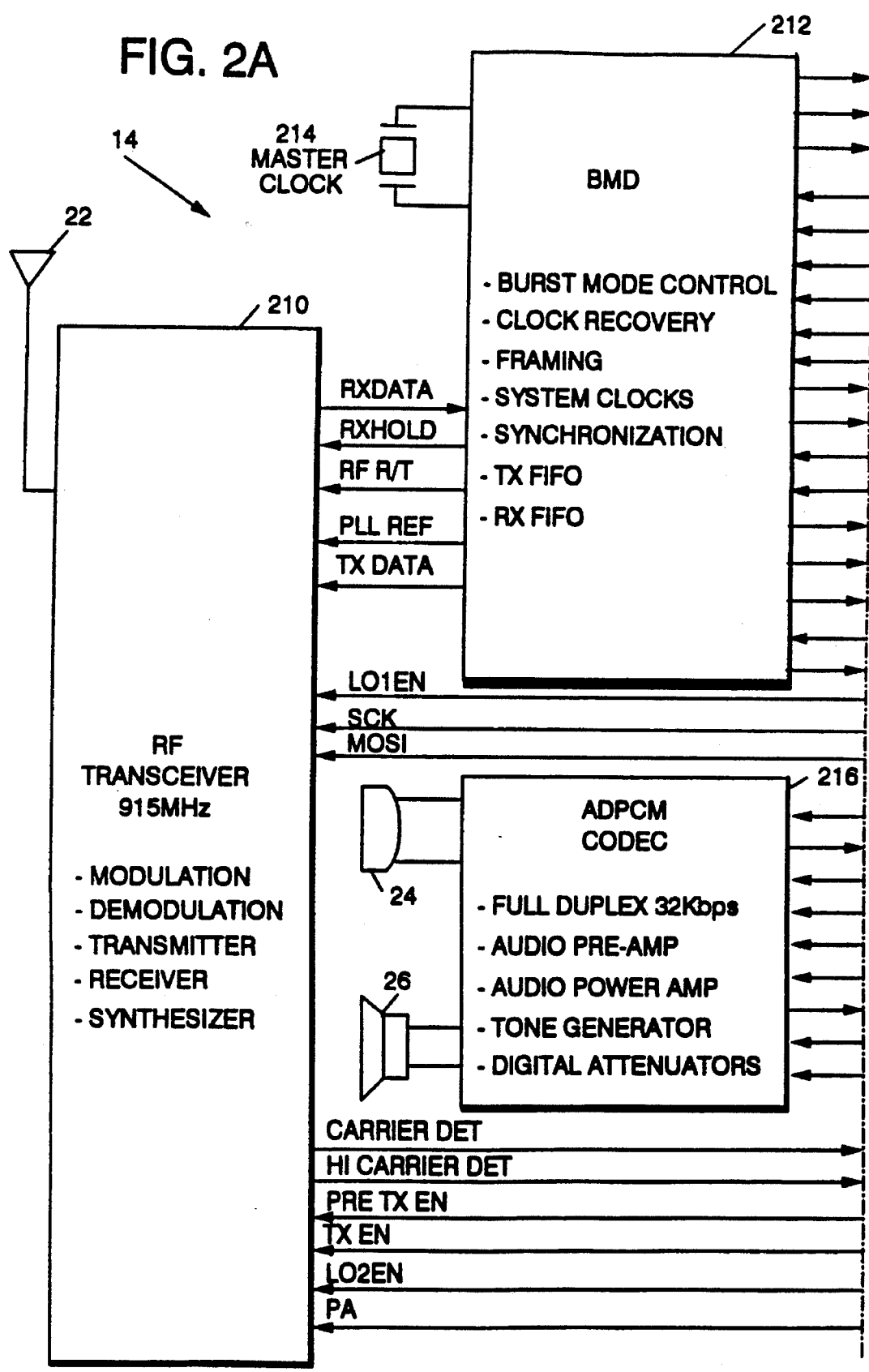

Referring now to FIG. 1, a communications system embodying the present invention will be described.

Communication system 10 includes a base unit 12 and a remote unit 14.

Base unit 12 receives its power from the alternating current power supply by the power utility on lines 16 and is connected to a public switching telephone network (PSTN) 18. Also, base unit 12 includes an antenna 19 for communications with remote unit 14. Remote unit 14 communicates with base unit 12 by transmission and reception of radio frequency signals through antenna 22. Remote unit 14 also may include a microphone 24 and a speaker or earpiece 26 for conversion of signals between sound and electronic form. In addition, remote unit 14 may also include a keypad of the DTMF type.

Referring now to FIG. 2, one unit of communication system 10, for example remote unit 14, will be described in greater detail.

It should be noted that the communications functions, including transmit power and frequency control described with reference to remote unit 14 will be the same for base unit 12. Base unit 12 may or may not include a keyboard 28 and most likely will not include a microphone 24 and an ear piece or speaker 26 as does the remote unit 14.

Remote unit 14 communicates with base station 12 through RF transceiver 210 which receives signals from and transmits signals to base unit 12 through antenna 22. The RF transceiver provides a frequency synthesizer, an RF receiver, an RF transmitter and modulation and demodulation functions in remote unit 14. Burst mode device 212 communicates with transceiver 210 to control burst mode operation to recover clock signals and to synchronize data frames between the base unit 12 and the remote unit 14. Burst mode unit 212 also controls sequencing and outputting of data from the VOICE CODEC. VOICE CODEC contains a Pulse Code Modulation (PCM) codec-filter. The name codec is an acronym from "COder" for the analog-to-digital converter (ADC) used to digitize voice and "DECoder" for the digital-to-analog converter (DAC) used for reconstructing voice. A codec is a single device used for digitizing and reconstructing the human voice. Typically, the voice is quantized with an 8 bit word at a sampling rate of 8 kHz yielding a serial data rate of 64 kbps.

64 kbps PCM codecs are widely known in the art and are readily available from manufacturers such as Motorola, OKI of Japan and Texas Instruments.

The burst mode device 212 has as a fundamental frequency control a master clock 214 which provides timing signals to permit the burst mode device 212 to generate clocking signals to other functional units in remote unit 14. The BMD provides bit timing and frame timing recovery. A digital phase lock loop (DPLL) within the BMD extracts the bit timing from the signal by measuring the time interval between zero crossings of the receive signal. With bit timing established, a correlator is used to detect the presence of a 24 bit unique word sequence embedded in the transmission stream. Detection of the 24 bit unique word identifies framing boundaries. Also embedded in the transmission stream is a 24 bit unique ID which prevents synchronization with an undesired system. The BMD uses the recovered frame timing to correctly position the transmit and receive bursts within the frame.

The operation of burst mode devices in TDD applications is widely known in the art. They are used in second generation cordless telephone systems (CT2) and the Digital European Cordless Telecommunications (DECT) system. Burst mode devices for these systems are manufactured by Motorola, Philips and VLSI Technology.

VOICE CODEC 216 converts sound information received by microphone 24 to electrical signals, amplifies the electrical audio frequency signals, and converts the audio frequency signals to digital representation by means of an analog to digital converter (ADC). VOICE CODEC 216 also includes a digital to analog converter (DAC) for converting received information in digital form to analog form. An audio power amplifier amplifies the converted analog information and provides it to speaker 26 for conversion to sound for the user. A pulse code modulation technique is used in the ADC and in the DAC. The pulse trains are provided to the burst mode device 214 for storage in a transmit temporary storage device such as a FIFO buffer for transmission to transceiver 210 at an appropriate time to be transmitted in one or more transmission frames. Conversely, burst mode device 212 receives incoming data from RF transceiver 210 and stores the incoming data in pulse code format in a receive buffer which may be an FIFO buffer for transmission to the VOICE CODEC 216 for conversion to an analog signal for amplification and conversion to sound in speaker 26.

The functions described above for remote unit 14 and similarly for base unit 12 are controlled by mode control unit 218.

Mode control unit 218 includes a microprocessor such as a model 6805C8 commercially available microprocessor, a random access memory 220, and a read only memory 222. Mode control unit 218 is connected to keypad 28 for entry of DTMF signals and to burst mode device 212, VOICE CODEC 216 and to RF transceiver 210. MCU 218 controls all the functions in unit 14. For example, mode control unit 218 controls the phase lock loop (PLL) programming for transceiver 210, the frequency hopping pattern control, control channel signaling for synchronization, transmit power control for RF transceiver 210, mode control for RF transceiver 210 and other telephone features which are not significant to the present invention. Data related to mode control are stored in random access memory 220, which is a part of mode control unit 218, and bootstrap code and basic control code for microprocessor 6805C8 is stored in read only memory 222.

Frequency control coefficients for RF transceiver 210 are stored in random access memory 220 in mode control unit 218. A table in RAM 220 stores the pattern of frequency hopping which will control transceiver 210.

MCU 218 also interprets data in the form of received signal strength indicator (RSSI). The RSSI signal and signals indicating channel quality are used to determine if low power signal frequency transmission is sufficient to maintain quality communication or if higher power frequency hopping transmission is required to maintain communication over the communication channel.

OPERATION OF FREQUENCY LOCKING TECHNIQUE IN ACCORDANCE WITH THE PREFERRED EMBODIMENT OF THE PRESENT INVENTION

The communications system according to the present invention takes advantage of frequency hopping techniques and employs multiple home channels. In this system which may be embodied by a wireless telephone system having a base unit and a remote unit, both base and remote are in standby mode when not in communication. While in standby mode, both units scan a preselected group of set-up channels, for example, these set-up channels may be referred to as channels A, B and C. Set-up channels A, B and C will be scanned continually for a predetermined number of cycles such as 30 cycles in standby mode and if communication is not established, the base and remote units will be put in a power conserving "sleep" mode.

Referring now to FIG. 3, a sequence of time frames 1–14 are shown during which the communications units referred to as the base 12 and handset 14 are in standby mode wherein each unit has a transceiver 210 which is in receive mode where, for example, the base receives frequency 1 during time frames 1–4, frequency 2 during time frames 5–8, frequency 3 during time frames 9–12 and then frequency 1 again in frames 13–16. During the standby mode, the remote unit 14 is also in receive mode whereby during frames 1–4 the remote is receiving on frequency 2, during frames 5–8 the remote is receiving of frequency 3, during frames 9–12 the remote is receiving on frequency 1 and during frames 13–16, the remote receives on frequency 2.

During standby-mode, both the base and remote transceivers 210 are in receive mode with the receive frequency being maintained for four consecutive frames and then changed to the next frequency in the set of frequencies set aside for the set-up channels. In the example shown in FIG. 3, there are three set-up channels designated by frequencies F1, F2 and F3 where F1 is Channel A, F2 is Channel B, and F3 is Channel C. Note that a complete cycle through the frames requires four frames at frequency 1, four frames at frequency 2, four frames at frequency 3, and then four frames at frequency 1.

Figure 4:
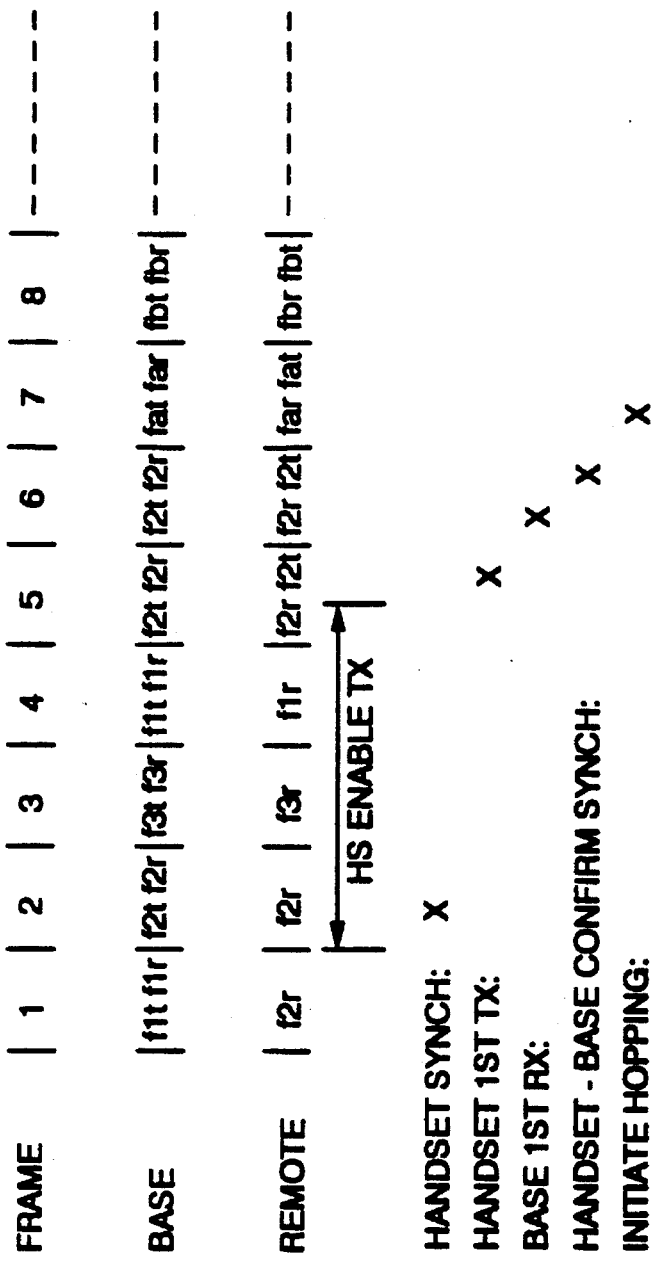
FIG. 4 is a time line chart showing frequency of transmission and reception of the communications units of FIG. 1 during an attempt at acquisition of frequency locking between the communications units over a sequence of time frames where the call is originated from the first communication unit or base unit.

If, for example, base unit 12 attempts to initiate a call, the sequence for acquisition, frequency locking and timing signal recovery is as shown in FIG. 4.

Transceiver 210 in base unit 12 transmits on frequency F1 during a first portion of frame 1 and receives on frequency F1 during a second portion of frame 1. During frame 2, the frequency of transmitting and receiving for the base unit transceiver 210 is changed to frequency F2, likewise during time frame 3 the frequency of transmission and reception of base unit transceiver 210 has changed to F3. During time frame 4, base unit transceiver 210 again transmits and receives on frequency F1. Thus, with three frequencies available for set-up, four time frames are required to insure acquisition.

During the same time frames, for example 1–4, remote unit 14 may be receiving any one of the three frequencies available during time frame 1 and if as shown in FIG. 4, remote unit 14 is monitoring frequency F2 while base unit 12 is transmitting on frequency F1, no communication occurs. If remote 14 is receiving on frequency F2 during frame 2, while base unit 12 is transmitting on frequency F2, remote unit 14 recognizes that there is a possibility of a request for communication based on the reception of the signal from base unit on frequency F2 during frame 2 and thus remote unit 14 enables its transmitter in transceiver 210. However, transmit enable takes several cycles which presents several options for the remote unit frequency control. First, remote unit 14 can remain on frequency F2 and be synchronized with the base unit when the transmitter becomes enabled at some later frame or, remote unit 14 can switch receive frequency in step with the base unit so that in frame 3 remote unit receives on frequency F3 even though in standby mode it might normally be receiving on some other frequency during frame 3.

Since the remote unit has received a signal on frequency F2 in this example, it would begin tracking the time of the base station so that at some later time, for example, in frame 5 when the base has returned to frequency F2 following a cycle through the other set-up channel frequencies, remote unit 14 would then transmit on frequency 2 during frame 5 which would be received by base unit 12, the receiver of which is set to receive on frequency F2 during frame 5. Remote unit 14 transmits on frequency 2 in frame 5 because the received frequency in frame 2 was on frequency F2 indicating that frequency F2 is a clear frequency capable of communication.

Alternatively, since frame timing has been acquired by remote unit 14, the remote unit 14 can then predict the frame timing and frequency of transmission and reception of base unit 12 during a future frame and could, if desired, set the transmitter and receiver in transceiver 210 of remote unit 14 to match the frequency of transmission and reception of base unit 12 during some future frame since the cyclable nature of transmission and reception from base unit 12 is known.

When remote unit 14 transmits a signal to base unit 12 on a frequency such as frequency F2 during time frame 5, base unit 12 receives this signal and recognizes that frequency F2 is an accepted frequency. During the next frame, frame 6, base unit 12 transmits a signal on frequency F2, the remote unit 14 remaining on frequency F2 during frame 6 and will recognize the signal from base unit 12 and also recognizes that base unit 12 has ceased cycling through set-up channel frequencies F1, F2 and F3 which confirms to both the base unit and the remote unit that communications have been established, acquisition has been acknowledged and the units are in frequency lock. No further acknowledgment signals other than the fact of the transmission and reception on the same frequency is required for frequency lock.

On the next cycle, the base unit 12 and remote unit 14 are free to transmit on any frequency available in the set of frequencies. The frequency selected indicated in FIG. 4 as frequency Fa can be selected either by a code transmitted during the frequency locking frame or based upon software stored in the random access memories of the mode control units 218 in the base unit 12 and the remote unit 14, respectively.

Subsequently, communications may occur either in single frequency mode or in frequency hopping mode depending upon other conditions which will determine quality of communications. For additional information relative to selection of single frequency mode or frequency hopping mode, reference is hereby made to patent application entitled Variable Mode Cordless Phone, Ser. No. 08/329,467, U.S. Pat. No. 5,528,623 filed on even date herewith, which is incorporated herein by reference.

Figure 5:
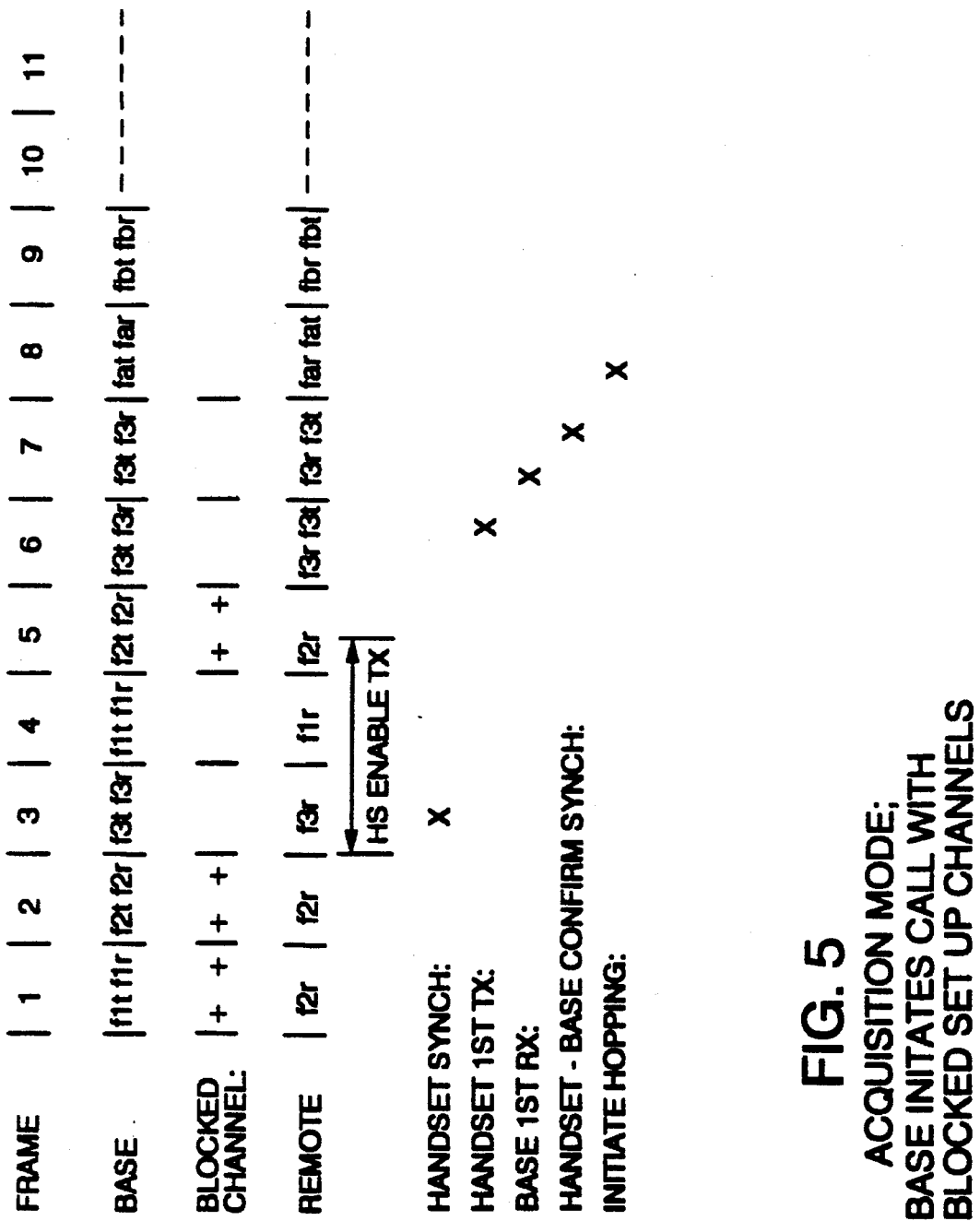
FIG. 5 is a time chart similar to FIG. 4 but with one or more channels blocked by interference or poor communications path.

Referring now to FIG. 5, the acquisition mode will be discussed in a situation where one or more of the available set-up channels are not available due to interfering signals on the frequency or selective frequency fading which renders frequency unavailable for communication. If, for example, during frame 1 frequency F1 is blocked, or during frame 2 frequency F2 is blocked, even though base 12 is attempting to initiate a call, remote 14 does not receive the signal on frequency F2 due to the channel block. Base unit 12 following the normal cycle of set-up frequencies changes its transmit and receive frequency in frame 3 to F3. In the example shown, remote 14 has arbitrarily switched to frequency F3 during frame 3 and receives the signal from base 12 since there is no channel block of frequency block F3 during frame 3. Mode control unit 218 switches the transceiver 210 in remote unit 14 from standby mode to acquisition mode and the frequency of the transceiver 210 in remote unit 14 now begins to follow the same cycle as the frequency of transmission reception of base unit 12.

As discussed above with respect to FIG. 4, remote 14 requires a certain length of time to enable its transmitter. This prevents it from responding immediately to base unit 12. Note that during frame 5, base unit 12 is again transmitting and receiving on frequency F2 which is a blocked channel. However, in frame 6, base unit 12 is transmitting and receiving on frequency F3 and remote unit 14 is receiving an transmitting on frequency F3, thus allowing acquisition even in view of blocked channel on frequency F2. Again, as before, both base unit 12 and remote unit 14 remain on frequency F3 for frame 7. Thus, both base unit 12 and remote unit 14 have acknowledged acquisition and communication is then permitted either in single frequency mode or in frequency hopping mode as is shown in frames 8 and 9 of FIG. 5.

Figure 6:
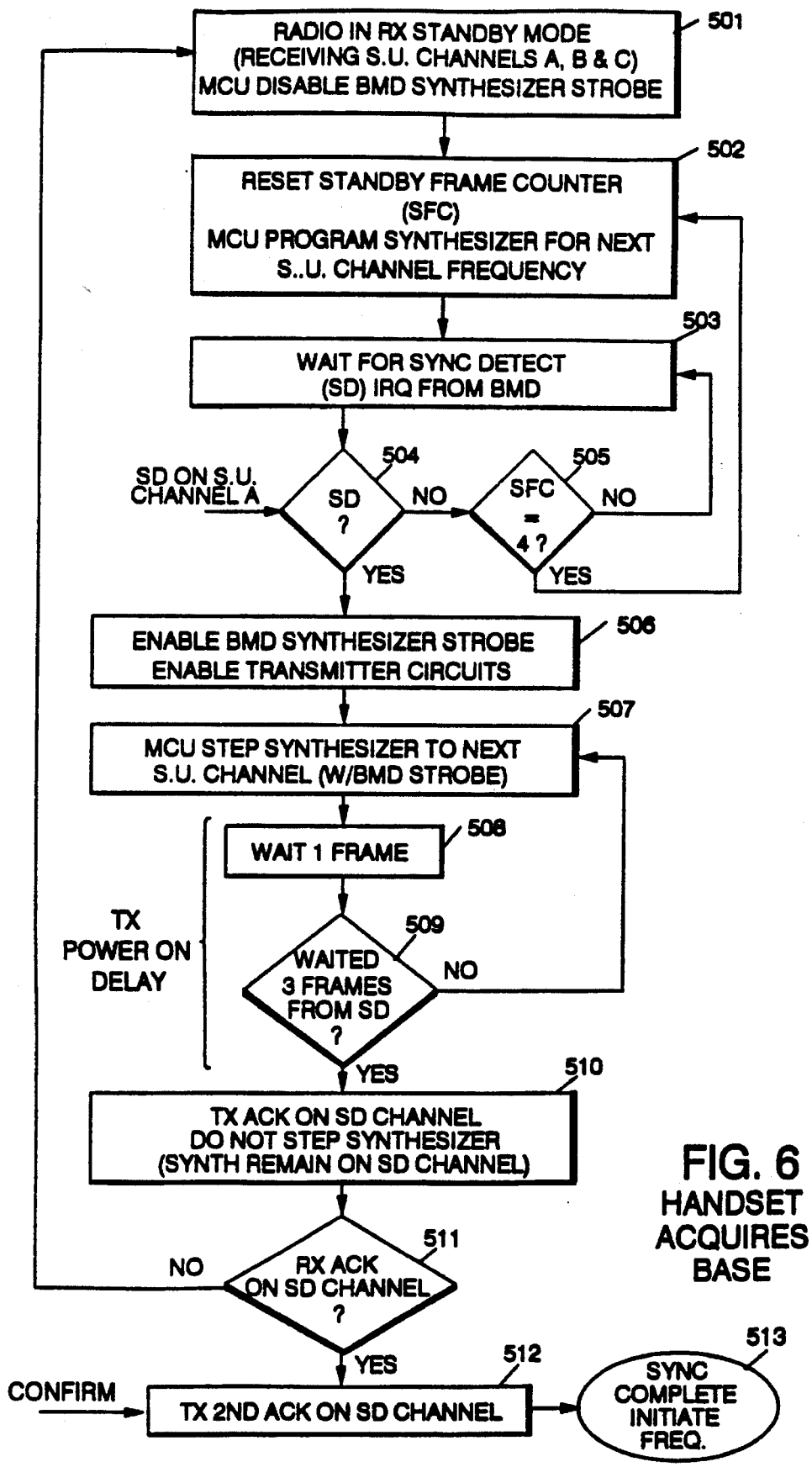
FIG. 6 is a flow chart of the process for acquisition of frequency locking between the communications units the preferred embodiment of the present invention.

Referring now to FIG. 6, the operation of the method according to the present invention will be further described.

The operation of base unit 12 and remote unit 14 are controlled by their respective mode control units 218 as shown in FIG. 2. Initially, remote unit and base unit are in standby mode 501 scanning set-up channels F1, F2 and F3. The receiver of remote unit 14 dwells on each set-up channel F1, F2 and F3, respectively, for a period of four frames. During standby mode, MCU 218 has disabled frame synchronous strobe from the burst mode detector (BMD) 212 in order to control the frequency synthesizer in transceiver 210. Programming the frequency synthesizer in transceiver 210 for the next set-up channel, for example, frequency F2 by MCU 218 is shown in 502. Also, the standby frame counter (SFC) is reset.

Next, (503) MCU 218 waits for a synchronization detect signal on one of the set-up channels to determine whether four frame times have elapsed. If four frames have not elapsed, transceiver 210 continues (504, 505) to wait for synchronization detect on that particular set-up channel, for example F2. If four frames have elapsed, the frequency generated by the frequency synthesizer is incremented (507) to the next set-up channel and the waiting process for synchronization detect is reinitiated (505).

In the event that synchronization detect occurs on a particular set-up channel, such as F2, transmitter circuits are then enabled (506) and control of the frequency synthesizer strobe is returned to the BMD 212 which has attained frame synchronization at this point. MCU 218 then steps the frequency synthesizer to the next set-up channel, for example F3, which is at this point under the control of BMD 212.

MCU 218 waits one frame period (508) and then frequency synthesizer is stepped (507). MCU 218 waits another frame period (508) and the frequency synthesizer is stepped (507) again until a total of three frames have occurred (509) from the initial synchronization detection.

This three frame waiting provides for transmitter power on delay to allow for the transmitter circuits to power up and stabilize. Remote unit 14 next transmits (510) an acknowledgment signal on the original synchronization detection channel such as F2, and the frequency synthesizer is not stepped, but rather remains on the original synchronization detect channel. See, for example, frames 5 and 6 in FIG. 4. Remote unit 14 waits for a signal on the original synchronization detect channel frequency such as F2. If such signal is not received, remote unit 14 returns to standby mode with frequency synthesizer programming returning to MCU. If this occurs, synchronization was achieved, but subsequently lost.

If MCU 218 receives a second acknowledgment on the original synchronization detect channel frequency such as F2 (see frame 6 in FIG. 4), the transmit frequency for each unit remains on the original synchronization detect frequency such as F2 and a second acknowledgment is transmitted by the remote unit 14 to base unit 12 to confirm synchronization. At this point, synchronization process is complete and frequency hopping mode may be initiated for communication.

Although the present invention have been described in detail, it should be understood that various changes, substitutions and alterations may be made without departing from the spirit or scope of the invention as defined by the appended claims.

What is claimed is:

1. A communications system comprising:

at least two communications units, each communications unit further comprising a transmitter and a receiver, said transmitter capable of transmitting on a plurality of different frequencies and said receiver capable of receiving on a plurality of different frequencies, and wherein frequency locking is required to insure that each communication unit is operating on a same frequency during a given time frame;

means for predetermining a plurality of n frequencies to be used as set-up channels;

means for establishing a plurality of time frames for transmission and reception of signals on said set-up channels between said units;

means for dividing each said time frame into a transmit period and a receive period;

means for first transmitting, during said transmit period of a first time frame, by an originating unit of said units, a signal on a first one of said plurality of n frequencies;

means for second transmitting, during a transmit period of a next time frame, by said originating unit of said units, a signal on a next one of said plurality of n frequencies;

means for repeating said second transmitting step for each additional frequency in said predetermined plurality of n frequencies;

means for third transmitting, during a transmit period of an n+1 time frame, by said originating unit, a signal on said first one of said plurality of n frequencies, such that in n+1 time frames, a signal has been transmitted on each of said n frequencies and also on said first frequency a second time in said n+1 time frame to complete a cycle of acquisition attempts by said originating unit;

means for first receiving on one of said plurality of n frequencies by a receiver in a second unit in said communications system for n+1 time frames;

means for second receiving on a next one of said plurality of n frequencies by said receiver and said second unit for n+1 time frames;

means for repeating the enabling of said second receiving means for each additional frequency in said n frequencies;

means for repeating the enabling of said first receiving means for n+1 time frames;

means for enabling a transmitter in said second unit as a result of the enabling of said first or second receiving means in said second unit receiving a signal on one of said n frequencies;

means for maintaining said frequency of said receiver in said second unit on one of said n frequencies;

means for fourth transmitting by a transmitter in said second unit, in a transmit period for said second unit of a time frame during which said one of said n frequencies is next received by said receiver in said second unit, a signal on said one of said n frequencies; and means for repeating the enabling of said last mentioned maintaining means and said fourth transmitting means for an additional time frame to acknowledge acquisition of frequency lock.

2. A method for acquisition of frequency locking between two or more units in a communications systems, comprising the steps of:

predetermining a plurality of n frequencies to be used as set-up channels;

establishing a plurality of time frames for transmission and reception of signals on said set-up channels between said units;

dividing each said time frame into a transmit period and a receive period for each of said units in said communications system;

first transmitting, during a transmit period of a first time frame, by an originating unit, a signal on a first one of said plurality of n frequencies;

second transmitting, during a transmit period of a next time frame, by said originating unit, a signal on a next one of said plurality of n frequencies;

repeating said second transmitting step for each additional frequency in said predetermined plurality of n frequencies;

third transmitting, during a transmit period of an n+1 time frame, by said originating unit, a signal on said first one of said plurality of frequencies, such that in n+1 time frames, a signal has been transmitted on each of said n frequencies and also on said first frequency a second time in said n+1 time frame to complete a cycle of acquisition attempts by said originating unit;

first receiving on one of said plurality of n frequencies by a receiver in a second unit of said communications system for n+1 time frames;

second receiving on a next one of plurality of n frequencies by said receiver in said second unit for n+1 time frames;

repeating said second receiving step for each additional frequency in said plurality of n frequencies;

repeating said first receiving step for n+1 time frames;

enabling a transmitter in said second unit if any of the above receiving steps results in said receiver in said second unit receiving a signal on one of said n frequencies;

maintaining said frequency of said receiver in said second unit on said one of said n frequencies;

fourth transmitting by a transmitter in said second unit, in a transmit period for said second unit of a time frame during which said one of said n frequencies is next received by said receiver in said second unit, a signal on said one of said n frequencies; and repeating said last two steps of maintaining and fourth transmitting for an additional time frame to acknowledge acquisition of frequency lock.

* * * * *